(12) United States Patent
Vermola et al.

(10) Patent No.: US 7,843,864 B2
(45) Date of Patent: Nov. 30, 2010

(54) PROVIDING SERVICE SELECTION AND OBTAINING SERVICES

(75) Inventors: Larri Vermola, Turku (FI); Tero Naumi, Koski (FI)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 10/561,337

(22) PCT Filed: Aug. 26, 2004

(86) PCT No.: PCT/IB2004/051579

§ 371 (c)(1),
(2), (4) Date: Dec. 15, 2005

(87) PCT Pub. No.: WO2005/022791

PCT Pub. Date: Mar. 10, 2005

(65) Prior Publication Data

US 2006/0285508 A1 Dec. 21, 2006

(30) Foreign Application Priority Data

Aug. 27, 2003 (GB) .................................. 0320075.5

(51) Int. Cl.
*H04H 20/71* (2008.01)
*H04H 60/09* (2008.01)
*H04J 3/16* (2006.01)
*H04N 7/173* (2006.01)

(52) U.S. Cl. .................... 370/312; 370/468; 455/414.3; 455/3.04; 725/50; 725/62

(58) Field of Classification Search .... 455/414.1–414.4
See application file for complete search history.

(56) References Cited

U.S. PATENT DOCUMENTS 6,640,248 B1 * 10/2003 Jorgensen .................. 709/226

(Continued)

FOREIGN PATENT DOCUMENTS

EP 1 246 057 A2 10/2002

(Continued)

OTHER PUBLICATIONS

Author: V. K. Bhargava; Title: High Rate Data Transmission in Mobile and Personal Communications; Date: Sep. 18-23, 1994; vol. 4; pp. 1106-1113 vol. 4.*

(Continued)

*Primary Examiner*—Nick Corsaro
*Assistant Examiner*—Tangela T. Chambers
(74) *Attorney, Agent, or Firm*—Ditthavong Mori & Steiner, P.C.

(57) ABSTRACT

Plural service providers each provide services to one or more multicast service systems, which forward service sets formed by bundling received services to a respective multicast operator. The service sets are then multicast in IP datacasting bursts, and can be received by a mobile terminal. Each service includes one or more service components, which have different media formats, e.g. audio, video, game, software, chat, offline web page, etc. The service components include content data and service identification data. A service set schedule giving timing information relating to the transmission of the IP datacasting burst and the transmission frequency is created. An IP burst begins with ESG data. The service set schedule may be part of the ESG data or it may be transmitted separately. The mobile terminal can use the timing information to tune the appropriate channel at the appropriate time to receive and then to decode service identification data relating to a required service, and subsequently obtain required service components thereof. The service components are stored in portions of the memory. Service selection is enabled by a user interface.

36 Claims, 5 Drawing Sheets

U.S. PATENT DOCUMENTS

| | | | |
|---|---|---|---|
| 6,769,127 B1 * | 7/2004 | Bonomi et al. | 725/39 |
| 7,274,909 B2 * | 9/2007 | Perttila et al. | 455/41.2 |
| 2002/0019228 A1 * | 2/2002 | McKenna et al. | 455/435 |
| 2002/0055331 A1 * | 5/2002 | King-Smith | 455/3.05 |
| 2002/0151327 A1 * | 10/2002 | Levitt | 455/556 |
| 2003/0096614 A1 * | 5/2003 | Paila | 455/450 |
| 2003/0110503 A1 * | 6/2003 | Perkes | 725/86 |
| 2003/0152107 A1 * | 8/2003 | Pekonen | 370/473 |
| 2003/0174678 A1 * | 9/2003 | Chang et al. | 370/335 |
| 2005/0043020 A1 * | 2/2005 | Lipsanen et al. | 455/422.1 |

FOREIGN PATENT DOCUMENTS

| | | | |
|---|---|---|---|
| EP | 1246057 A2 * | 10/2002 | |
| EP | 1 337 071 A2 | 8/2003 | |
| GB | 2 396 444 A | 6/2004 | |
| JP | 6 268769 A | 9/1994 | |

OTHER PUBLICATIONS

Authors: N. Vogiatzis, J. A. Sanchez-P., Th. Zahariadis and N. Zervos; Title: An Adaptive Multicarrier Wireless Access System; Date: Sep. 23-28, 2000; vol. 1; pp. 298-303 vol. 1.*

Chinese Office Action for corresponding CN Application No. 200480024491.8, Aug. 14, 2009, China.

Chinese Office Action for corresponding CN Application No. 200480024491.8, Jan. 9, 2009, China, pp. 1-18.

Chinese Office Action for corresponding CN Application No. 200480024491.8, Mar. 13, 2010, China, pp. 1-7.

* cited by examiner

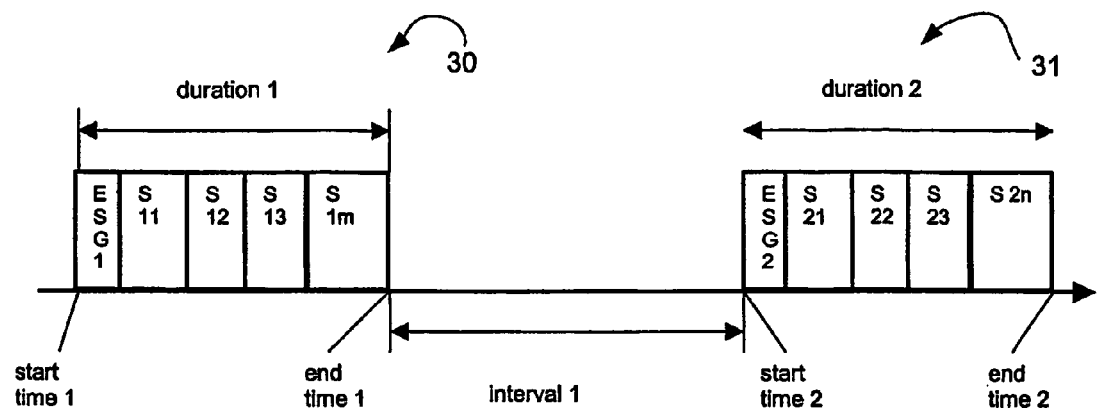
Figure 2
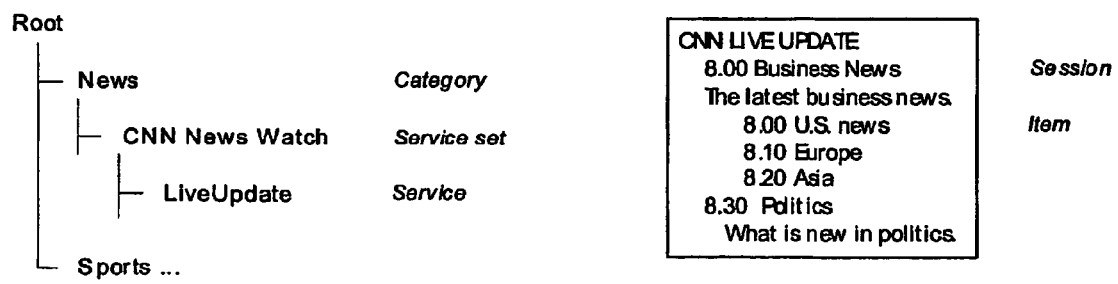
Figure 3A
Figure 3B

PROVIDING SERVICE SELECTION AND OBTAINING SERVICES

FIELD OF THE INVENTION

This invention relates to a method of and a system for providing service selection at a mobile terminal. The invention relates also to a mobile terminal comprising means for obtaining required service components of a service, and to a method of operating a mobile terminal comprising obtaining required service components of a service selection data on a display, and a mobile terminal comprising a controller arranged to order hierarchically services.

BACKGROUND OF THE INVENTION

The deployment of advanced high bit-rate mobile networks has opened up new opportunities for delivering services in a way that was not possible with earlier, second generation, wireless networks. Third generation systems such as Universal Mobile Telephone Service (UMTS) will enable the delivery of new digital services such as video calls and the playback of multimedia applications that are comprised of audio and video clips. This may also be enabled by lower bit-rate systems such as High Speed Circuit Switched Data (HSCSD) and General Packet Radio Service (GPRS) specified for use with the Global System for Mobile Communications (GSM) wireless standard.

Although the high bit-rates of UMTS systems are promising for the provision of digital services, many estimates forecast that these systems can reliably deliver data rates of only 64 to 384 kbit/s to moving mobile terminals, as opposed to up to 2 Mbit/s for stationary environments. The moving terminal rates provide fairly good performance for delivering high quality digital audio and acceptable quality moving image clips. However, at these transfer rates, it will be difficult to handle very highly data-intensive tasks such as delivering high quality full-motion video and transferring very large data files to mobile terminals. Attempts at downloading very large data files is likely to lead to inconveniently long downloading times, and is unlikely to be the most economical in terms of cost per megabyte. Accordingly, alternative broadband delivery channels that could provide a practical solution for highly data-intensive tasks in terms of lower cost and convenience for the parties involved have been investigated.

One such delivery channel that has shown promise is Digital Video Broadcasting (DVB). DVB-T, which is related to DVB-C (cable) and DVB-S (satellite), is the terrestrial variant of the DVB standard and is a wireless point-to-multipoint data delivery mechanism developed for digital TV broadcasting and based on the Moving Picture Experts Group (MPEG)-2 transport stream for the transmission of video and synchronized audio. DVB-T has the capability of efficiently transmitting large amounts of data over a radio channel to a high number of users at a low cost (the cost being low when compared to data transmission through mobile telecommunication networks using e.g. UMTS/GPRS). DVB-T data rates have been shown to provide up to 4-20 Mbit/s, where the lower end of the range corresponds to reception within a very high speed (300 km/h) moving receiver. Another advantage of DVB-T is that it has proven to be exceptionally robust, particularly in that it works well with receivers moving in geographic conditions that would normally affect other types of transmissions, such as with the rapid changes of reception conditions found when moving in hilly or mountainous terrain.

Other examples of broadband data broadcast networks include that provided under the Advanced Television Systems Committee (ATSC). Both ATSC and DVB utilize a containerisation technique in which content for transmission is placed into MPEG-2 packets which act as data containers. Thus, the containers can be utilized to transport any suitably digitised data including, but not limited to High Definition TV, multiple channel Standard definition TV (PAL/NTSC or SECAM), and broadband multimedia data and interactive services.

The combined use of mobile telecommunications with a broadband delivery channel such as DVB-T has been proposed in the past in order to achieve efficient delivery of digital services to users on the move. This would take advantage of existing infrastructures in the effort to provide personal communications (already prevalent) and the growing demand for Internet access, together with the expected rise of digital broadcasting, so that users can receive these services with a single device. Furthermore, DVB-T is a cross-platform standard that is shared by many countries thereby avoiding many issues caused by frequency compatibility and roaming. The combination of mobile telecommunications and a relatively very low cost digital broadband channel provides the possibility of interactive services including uni-directional and bi-directional services such as audio and video streaming (TV & Radio), file downloads and advanced gaming applications etc. This allows some flexibility in the way different media content is combined, delivered and consumed.

Because of the nature of the crossmedia delivery, different content formats from one content provider could easily be unidentifiable by the end user, which reduces the motivation of an individual content provider to provide content to content aggregators or service providers.

SUMMARY OF THE INVENTION

According to a first aspect of the invention, there is provided a method of providing service selection at a mobile terminal, the method comprising: transmitting a plurality of services, each of the services comprising one or more service components, at least some of the service components having different media formats, the service components for a given service being transmitted in a time-sliced manner at a given frequency; generating service identification data relating service components at a given frequency to services and identifying the media format of each service component; repeatedly transmitting the service identification data at the frequency carrying the corresponding service components; and repeatedly transmitting information relating to the timing of transmissions of the service identification data.

This can allow a mobile terminal to use the timing information to tune to the frequency at the appropriate time to decode service identification data relating to a required service and subsequently obtain required service components thereof, potentially resulting in a saving in power usage. The inclusion in the service information data of the media format allows it to be consumed easily by a terminal. The timing information may include data relating to IP datacasting burst parameters such as, for example the start time of the IP burst, the duration of the burst, the time to the next burst, etc.

Although the service identification data relates to services and service components at a given frequency, a mobile terminal may receive multiple service components from a single service at different frequencies. This can occur for example if different service components are received under different cells.

The timing information may be transmitted in a network different than that used for the service identification data information transmission. Here it may be performed in response to an inquiry from a mobile terminal, which may be using the different network.

The method preferably further comprises receiving the service identification data at a mobile terminal; and at the mobile terminal, hierarchically arranging the services including the service components from the received service identification data.

According to a second aspect of the invention, there is provided a system for providing service selection at a mobile terminal, the system comprising: means for transmitting a plurality of services, each of the services comprising one or more service components, at least some of the service components having different media formats, the service components for a given service being arranged to be transmitted in a time-sliced manner at a given frequency; means for transmitting service identification data relating service components at a given frequency to services and identifying the media format of each service component; means for repeatedly transmitting the service identification data at the frequency carrying the corresponding service components; and means for repeatedly transmitting information relating to the timing of transmissions of the service identification data; whereby a mobile terminal can use the timing information to tune to an appropriate frequency at an appropriate time to decode service identification data relating to a required service and subsequently obtain required service components thereof, potentially resulting in a saving in power usage.

Crossmedia data, i.e. data having many different media formats, has traditionally been difficult to manage and identify from an end-users point of view. The invention can provide the bundling and aggregating of data having different media formats into bigger entities, aggregates or sets that are easier to identify by an end-user, thus making the access of relevant services or service components more simple. Through one user interface or application the user operating a single terminal can access service components having different media formats. A service provider can use one channel to transfer all electronic services or media formats to end users.

The invention allows the same content to be sent in the systems of multiple operators and to the customers of different operators. This is likely in most cases to result in an increase in cost-efficiency. Therefore one service, having one identifying address, can be accessed by the customers of one or more operators, and potentially from one or more service sets. This can provide for the wider distribution of content than that which might be possible without using the invention.

A service component may be defined as an item of consumable content. In this case, all consumable content items may be defined as service components.

According to a third aspect of the invention, there is provided a mobile terminal, comprising: means for receiving at least one repeated transmission of information relating to the timing of transmissions of service identification data; means for using the timing information to tune to an appropriate frequency at an appropriate time to decode service identification data, the service identification data relating service components at the frequency to services and identifying the media format of each service component; and means for subsequently obtaining, from service components transmitted in a time-sliced manner at the given frequency, required service components of a service.

According to a fourth aspect of the invention, there is provided a method of operating a mobile terminal, comprising: receiving at least one repeated transmission of information relating to the timing of transmissions of service identification data; using the timing information to tune to an appropriate frequency at an appropriate time to decode service identification data, the service identification data relating service components at the frequency to services and identifying the media format of each service component; and subsequently obtaining, from service components transmitted in a time-sliced manner at the given frequency, required service components of a service.

The method preferably comprises using the service identification data to generate a service guide for one or more services.

According to a fifth aspect of the invention, there is provided a method of providing service selection data on a display, comprising: receiving service identification data relating service components at a given frequency to services and relating services at the given frequency to service sets; hierarchically arranging services including the appropriate service components; and displaying the different service sets, services or service components.

The arranging step can comprise using data items describing the various service components for categorising received content items. Here, the content items preferably are categorised according to content type. Alternatively or in addition, the services are arranged in an order according to their timing.

A method of receiving a content item according to the invention comprises: providing service selection data using the above method; and following selection of a displayed service set, service or service component, tuning to the correct frequency at the appropriate time when the selected service set, service or service component is being transmitted.

According to a sixth aspect of the invention, there is provided a mobile terminal comprising: means arranged to receive service identification data relating service components at a given frequency to services and relating services at the given frequency to service sets; a controller arranged to order hierarchically services including the appropriate service components; and means arranged to display the different service sets, services or service components.

Embodiments of the invention will now be described, by way of example only, with reference to the accompanying drawings.

BRIEF DESCRIPTION OF THE DRAWINGS

In the drawings:

FIG. 2 illustrates how service components are transmitted on a channel using time-slicing in one embodiment of the invention;

FIG. 3A shows schematically one example of the hierarchy under which service components can be found;

FIG. 3B shows an example of a partial content of one service;

FIG. 5 illustrates how the layout includes a service selector area and a service display area;

FIG. 6 illustrates an example of the selection of one service within in a service set in the display;

FIG. 7 illustrates the display of services forming part of the service set selected in FIG. 6; and FIG. 8 illustrates the display of service components forming part of the service selected in FIG. 7 in a selectable manner.

DETAILED DESCRIPTION OF THE PREFERRED EMBODIMENTS

A multicast service system bundles certain services together into a service set. Each service set is associated with identifying data including an identifier unique to the service set. The identifying data also includes a number of different type metadata items both for the service set and for the services included in the service set. The identifier and the metadata are preferably transmitted in a table format in the transport stream. The table can be similar to the tables used in DVB-T, such as for example the bouquet association table (BAT) of the standard ETSI EN 300 468 (the '468 standard). The identifier and metadata items are preferably presented as descriptors like those defined in the '468 standard.

One multicast service system may bundle services from one or more service operators into one or more service sets. These services may comprise live content and/or stored content. The multicast service system may forward the bundled service set to one or more multicast operators, which can then transmit the forwarded service sets as multicasts to receivers in IP (Internet Protocol) datacasting bursts. This is illustrated in FIG. 1.

Figure 1:
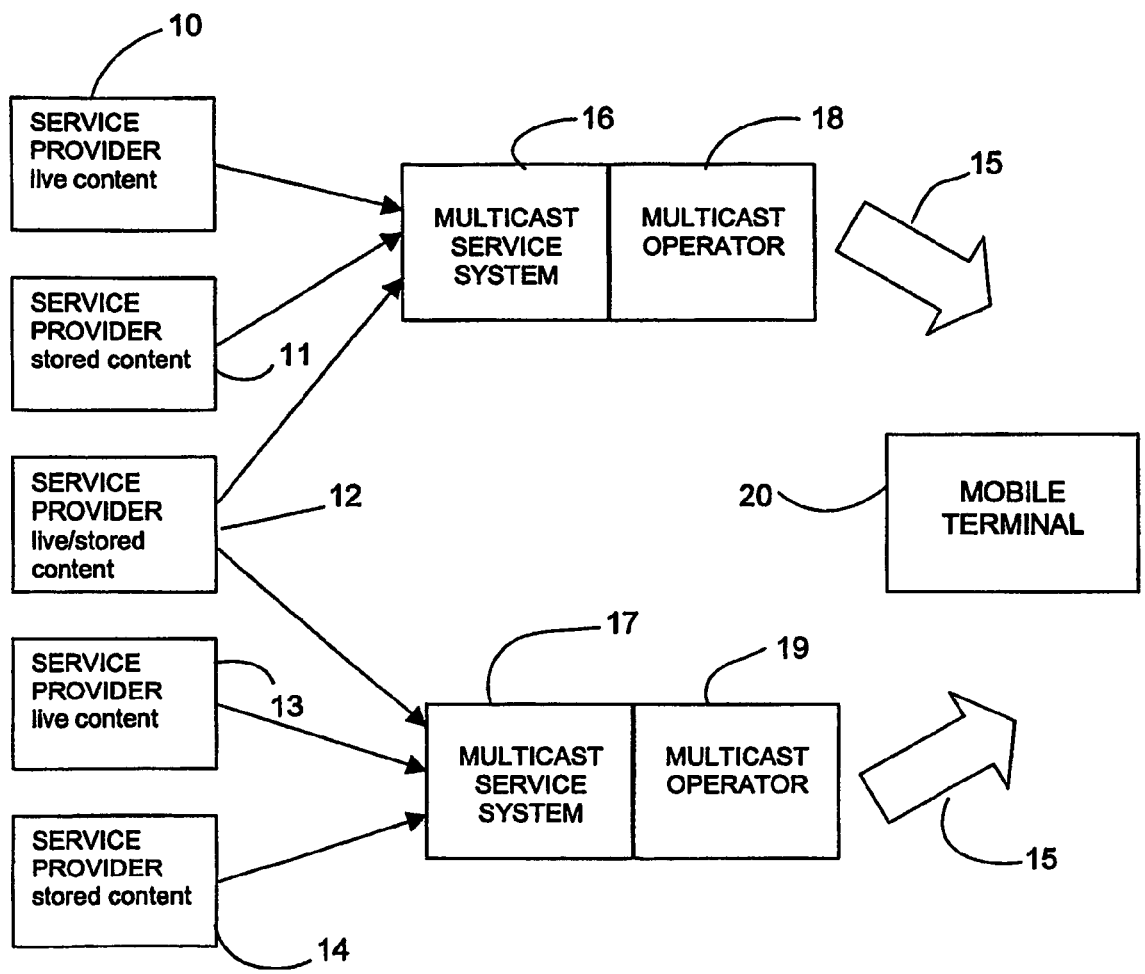
FIG. 1 illustrates the authoring of multicast service sets, and the provision of services to a mobile terminal.

Referring to FIG. 1, first to fifth service providers 10-14 are shown, each of which is a provider of live content, of stored content or of mixed content. The first to third service providers 10-12 provide services to a first multicast service system 16. The third to fifth service providers 12-14 provide services to a second multicast service system 17. Each of the multicast service systems 16, 17 forwards service sets formed by bundling received services to a respective multicast operator 18, 19. The service sets are then multicast in IP datacasting bursts 15, and can be received by a mobile terminal 20.

Each service provider may provide one or more services. Each service comprises one or more service components. Each of the service components may have a different media format. A service component could be in any format, for example audio, video, game, software, chat, offline web page, carousels and so on. The service components may comprise live and/or stored content. The service components comprise, in addition to the content data, a number of data items associated with and describing the component. The data items may also comprise metadata items. In one embodiment of the invention the descriptive data items and metadata items may be transmitted or signalled in table format. The table may for example be similar to the Service Description Table (SDT) or the Event Information Table (SIT) as described in the '468 standard. Some or all of the data items preferably are presented in the same way as the descriptors defined in the '468 standard. In addition to the tables and descriptors defined in the '468 standard, the multicast service system may associate one or more of the service sets and/or the service components with other data items, e.g. data relating: to a bandwidth for the service set and/or the service component, to the file size of a downloadable software file, to parental control, to the price of a service, to keywords, sources or genre, to the ordering of a service set and/or the service itself, and so on. Bandwidth can be allocated to a service, to a service component or to a service set.

In one embodiment of the invention the multicast service system 16,17 creates a service set schedule, which comprises information relating to the timing of the transmission of the IP datacasting burst. The timing information may include data relating to IP datacasting burst parameters such as, for example the start time of the IP burst, the duration of the burst, the time to the next burst, etc. The service set schedule also may comprise information concerning the carrier transmission frequency of the service set.

The service components (S11, . . . , S1$m$; S21, . . . , S2$n$) relating to a particular service may be transmitted in a burst over a DVB-T network. This is illustrated in FIG. 2. First and second bursts 30, 31 have a duration ('duration 1', 'duration 2'), defined by start and end times ('start time 1', 'start time 2'; 'end time 1, 'end time 2'). The bursts 30, 31 are transmitted with an interval ('interval 1') between the end of the first burst and the start of the second burst. In this example each burst commences with ESG data (ESG 1, ESG 2).

The content of consecutive bursts 30, 31 may be the same, or they may be at least partly different. Instead of a burst containing all service components for a set and containing service components relating only to that set, one burst may comprise any number of the service components of a service, or it may contain service components from one or more services or service sets. The order in which the service components and the ESG data are in the burst is determined by the multicast service system or by the multicast operator.

The service set schedule may be part of the ESG data or it may be transmitted separately.

The data items associated with and describing the service set, the services and the service components when combined with the service set schedule comprise Electronic Service Guide (ESG) data.

The ESG data or parts thereof may also be transmitted through a separate, second network. This second network would normally be a mobile phone network, such as GSM, GPRS, 3G or UMTS, but might be a WLAN or any other communications network. This second network preferably is wireless, but might instead be wired. The ESG data transmitted via the second network may be used by a terminal receiving the ESG data for controlling the terminal (and a receiver forming part thereof), for the reception of IP datacasting bursts.

If transmitted over DVB-T, the ESG data may be transmitted on an IP Control Channel (IP-CC). The ESG data includes metadata about the services, such as what types of services are available, how the service content can be received and how it can be consumed. This metadata is sent as a set of announcement files using IP based protocols. In one embodiment, the ESG data on the IP Control Channel is transmitted repeatedly in carousel-style.

In one embodiment of the invention, illustrated in FIGS. 3A and 3B, the available services are arranged hierarchically. FIG. 3A shows one example of the hierarchical structure of the services and FIG. 3B shows an example of a partial content of one service. At the highest level, the hierarchical structure contains categories. There can be many levels of categories. The categories classify the service sets. Service sets combine the same kind of services together, although they can instead relate to an identifiable entity, for example CNN(RTM), or BBC(RTM). A service set is owned by a Service Provider (SP) or a Content Provider (CP). One CP or SP can have many service sets. One service can belong to many different service sets but all the services of one service set are preferably owned by the same SP or CP. Services are the lowest level of the hierarchy in this example. The hierarchy of the available services is quite static. Services and service sets can change, but changes are infrequent and no end time for the service is usually announced to the user. The ESG data contains metadata describing the level in question (i.e. whether it is a category, service set or service) and links to more detailed information. A service set can have a default service, i.e. a service which is opened as the service set is entered, identified by the metadata. A service set may also be associated in the user interface with a button or menu behind which there is a list of included services.

The more dynamic part of ESG information is the program part. The program part includes service sessions, which are instances of services and which have a start time and a stop time. Service sessions comprise service items or service components. Service items are "pieces" of content that can be individually consumed. All the service items of the service session are transmitted using same kind of transmission parameters. As with service sessions, service items can have their own start time and stop time inside the service session. It depends on the multicast operator 18, 19 whether the schedules of the service items made are to be shown to the users. After transmission of the service session, the information related to sessions and items is no longer of interest, so is not broadcast anymore.

This hierarchical structure makes it easier for the user of the terminal 20 to find the services that they are interested in, and also makes it easier for the operator 18, 19 to schedule the sessions so that the service sessions that are deemed to be likely to interest the same people overlap as little as possible.

For example, as illustrated in FIG. 3A, a service category could be "News" with a service set "CNN News Watch" and under that a service "Live Update". The service News-.CNNNewsWatch.LiveUpdate contains service sessions, for example, a program about the latest business news, as shown in FIG. 3B. The service sessions includes items, which can be, for instance, news related to different parts of the world. If the items also are scheduled and the schedules are shown to the user, the user can watch the news only when a part or parts of interest is being transmitted.

There are two kinds of announcements related to ESG information that is transmitted: hierarchy announcements and service session announcements. The division is based on the described ESG parts. The transmission of the announcement files can be done as continuous or carousel-type transmission, i.e., as soon as all the files of the announcements have been sent, they are sent again. There may be a pause between two consecutive transmissions. In one embodiment of the invention the terminal can start listening to the announcements when it needs the ESG information. The two kinds of announcements may be combined or sent separately. In another embodiment of the invention item announcements may also be transmitted but in one embodiment of the invention they must be retrieved through an interaction channel such as a mobile phone communication network, i.e. they are not broadcast as are the other announcements.

To be able to show the ESG information to the user, the terminal must perform ESG discovery and receive the information e.g. via IP-CC.

Figure 4:
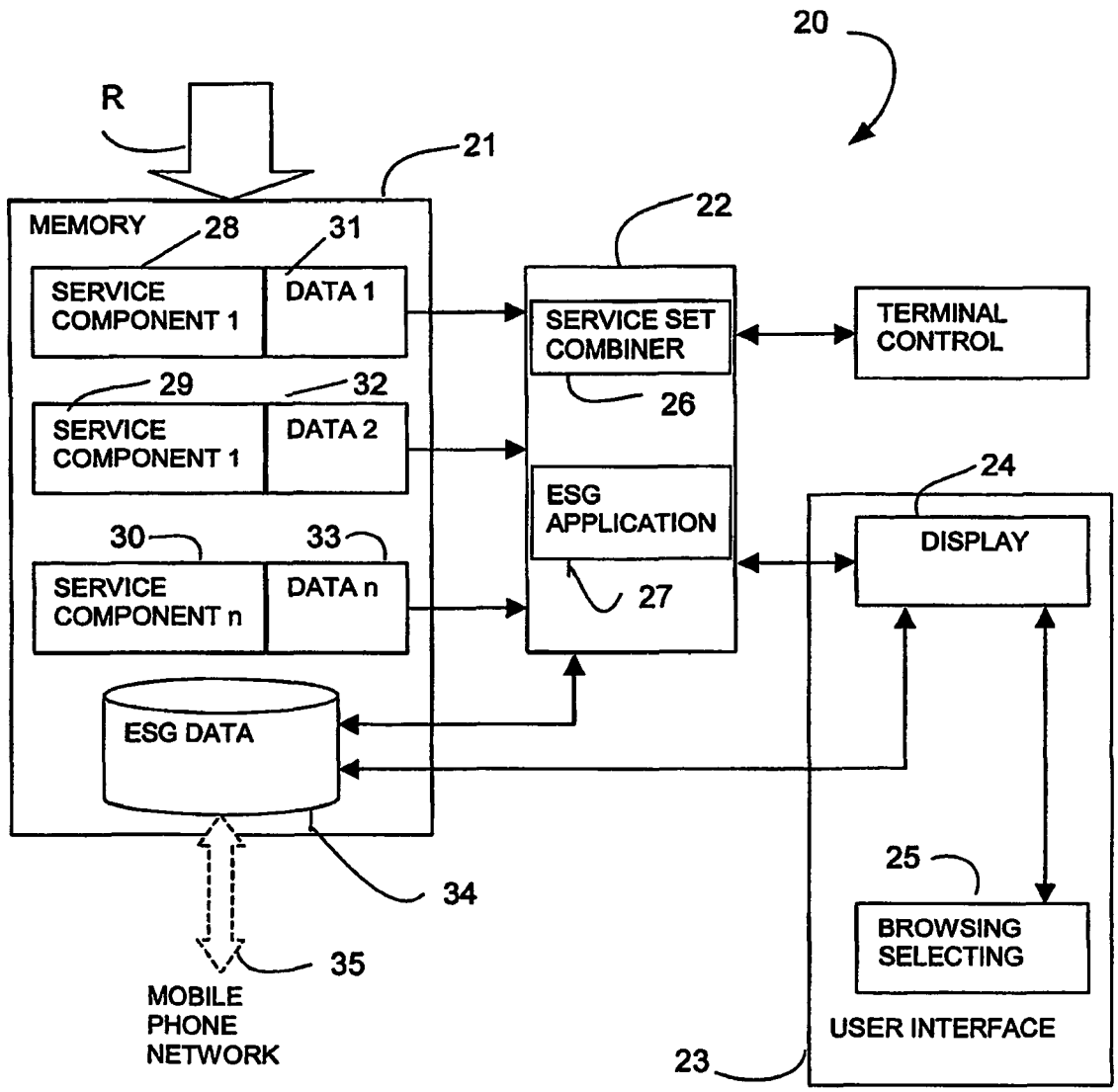
FIG. 4 shows schematically the arrangement of selected hardware and software components forming part of a DVB-T client according to the invention and constituting the mobile terminal shown in FIG. 1.
Figure 5:
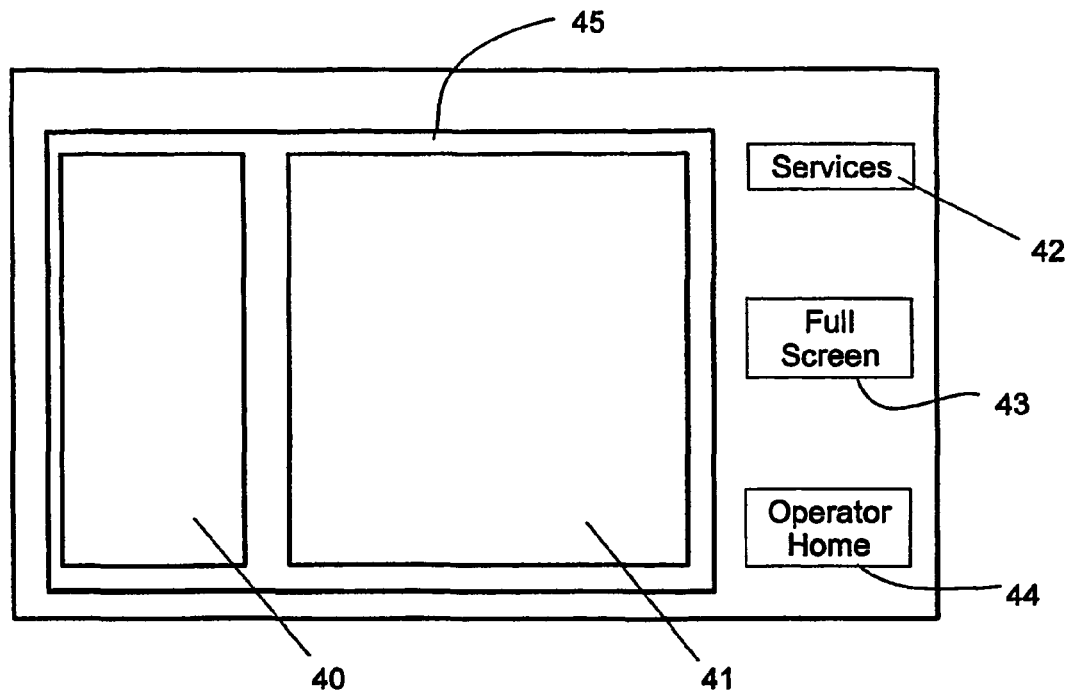
FIGS. 5 to 8 illustrate examples of successive screen-shots of a display forming part of the user interface of the mobile terminal of FIG. 4, and in particular.

In one exemplary embodiment of the invention shown in FIG. 4, the mobile terminal 20, only partly shown, is implemented as a DVB-T client having a DVB-T receiver. The receiver has an air interface with the DVB-T network. The terminal 20 gets the information R from the DVB-T network as IP datacasting bursts through the receiver. When the terminal 20 is turned on and the ESG information should be received for the first time, the information between the network and the terminal flows as follows:

The receiving part of the terminal 20 locates the desired network. The frequencies are scanned through until the desired DVB-T network is found. The network can be the first network found, a user defined network, a network configured to the terminal etc. The receiver then receives and decodes the Network Information Table (NIT). In this context, the receiver also may locate other information, e.g. the IP/MAC Notification Table (INT). One DVB-T network may carry several channels. IP platforms can be considered as channels. The terminal may extract from the received NIT table information concerning which channels are available. The terminal 20 then selects a channel and may then access the available services.

In order to make sure that the user does not have outdated information, the information must be updated every now and then. The announcements may be sent continuously, using a carousel, thus the terminal could be made to listen to the latest announcements all the time. However, because it can be important to save power, each announcements contain an expiry time, which is an absolute time indicating when the next version is due. The new version is not necessarily different from the old version, but it is guaranteed that there will not be any changes during the validity of one version. The update interval is different for the different parts of the ESG because the probability of a change is different. For example, the update interval of the hierarchy usually is much longer than the update interval for the sessions. The expiry time may be used for controlling the receiver to turn-on. In particular, the terminal need only receive announcements when the currently stored announcement is just about to or has just expired.

Therefore, after receiving ESG information for the first time, if the terminal does not move from one network area to the area of another network, the terminal need only listen to the announcements when it is time for the update. In case of a hierarchy file update, the terminal receives the hierarchy file, then determines if the modification time of the hierarchy is later than the modification time of the hierarchy in its database. If the received hierarchy is newer, it is updated to the database. Otherwise the terminal just marks down the next expiry time. When checking the hierarchy file, the terminal also reads the expiry time for the session announcements and main page carousels. However, because the update interval for them can be shorter than the update interval for the hierarchy, also the update interval may be given for sessions such that the following expiry times can be calculated without checking the hierarchy file.

If unexpected updates occur during the update interval, the terminal can be informed through an alert service that the ESG information should be updated. This can occur in any suitable way. For example, the alert service can be a carousel with notifications to the terminal 20 or to the end-user.

If the terminal moves to another network area, the terminal must immediately start to update the information according to the announcements in that area.

Operation of the mobile terminal 20, and in particular a user interface thereof in one embodiment of the invention, is now described with reference to FIGS. 4 to 8. In these Figures, the same reference numerals are used for like elements. Referring to FIG. 4, the mobile terminal 20, only partly shown, comprises generally a memory 21 which is connected to a service data handler 22 and to a user interface 23. The user interface 23 includes a display 24 and a browsing selector 25, for example a keypad or a touch-screen input device. The data handler 22 is formed from a service set combiner application 26 and an ESG handling application 27. The memory 21 is arranged to store N service components, three of which are illustrated at 28-30, along with the service identification data 31-33 corresponding thereto. The memory 21 also stores ESG data in an ESG data storage area 34.

The mobile terminal 20 receives and stores the IP datacasting burst comprising ESG data and the service components and the associated data in a memory. In one embodiment of the invention the received data is buffered prior to storing it. On the basis of the ESG data and the associated data items, the terminal 20 is able to associate the service components with the appropriate service sets. The user of the terminal 20 may browse and select the received content for viewing or rendering. The data items describing the various service components can be used for setting up a hierarchy for categorising the received content items. Further the data in the service set schedule may be used for arranging the services in order according to their timing (now, next, today, next week, etc.).

The mobile terminal 20 can extract from the received ESG data and the received service set schedule information concerning the timing of the transmissions and concerning the carrier transmission frequency or frequencies of the service sets or service components. Following selection of a service set or service component, the terminal 20 is therefore able to tune to the correct frequency at the appropriate time when the desired or selected service set or service component is being transmitted. The terminal can remain turned off at other times in order to save power.

As described below, the different service sets are shown displayed in the user interface of the terminal. The user interface also comprises browsing and selecting means.

The Electronic Service Guide (ESG) contains information about the services available. Through the information in the ESG, the user can select the services and items he/she is interested in and find stored items on the terminal. However, the terminal must first get the information from the network, using a mechanism so-called ESG discovery.

The terminal 20 operates to store received service components and the corresponding service identification data, as well as the received ESG data, in the appropriate parts of the memory 21. The ESG data may be received over the DVB-T network, or through a mobile telephone network, illustrated at 35. The service set combiner application 26 uses the data to form service sets including only the services which are intended to form part of the respective service sets. Some of the service components and the corresponding service identification data stored in the terminal 20 may have been received previously, perhaps when the mobile terminal was receiving transmissions in another cell. In one embodiment of the invention these earlier received service components (whether or not received under another cell) may be used together with service components which are received under the current cell as inputs to the service data handler 22. The data bursts in different cells may be transmitted using the same frequency (SFN—single frequency network), or different frequencies may be used in the different cells. The hierarchy data is used to categorise different content types. Service components can be included in more than one service set. Next, the data is sorted in an appropriate manner.

Service selection is enabled by the user interface 23. In one embodiment of the invention the display 24 might be like that of FIG. 5 initially. Here, an information or advertisement area 40 is located next to a service display area 41 within a large window 45. On the right side of the display 24 are included a number of 'keys' of which three 'keys' 42-44 are shown, in practice areas of the display which can be selected using a stylus or the like. In this example the 'keys' 42-44 if selected would provide access to a services menu, to a full screen display control function or to a homepage of the present multicast operator respectively. The display 24 once the services 'key' 42 has been operated is illustrated in FIG. 6.

Figure 6:
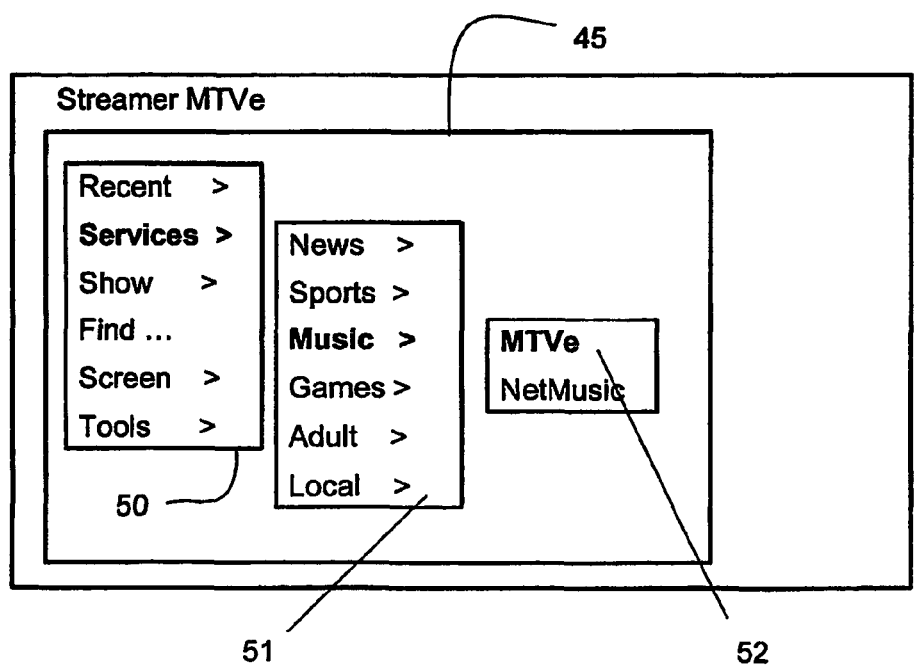

Referring to FIG. 6, illustrating one embodiment of the invention, it can be seen that the available options are listed vertically in a window 50 included at the left side of the display 24 within the large window 45. Since 'services' has been selected, the available categories are listed in a second window 51, placed to the right of the first window 50, but also within the large window 45. In this example, further the category 'Music' has been selected by a user of the terminal 20, using a stylus or key input. This has revealed in a third window 52 placed to the right of the other windows, and preferably close to the second window 51, a list of the services sets which fall into the category 'music', which in this example are MTVE and NETMUSIC, service sets. Selection of the service set called MTVE causes the terminal to provide the display illustrated in FIG. 7. The made selections are shown in this example highlighted in the display.

Figure 7:
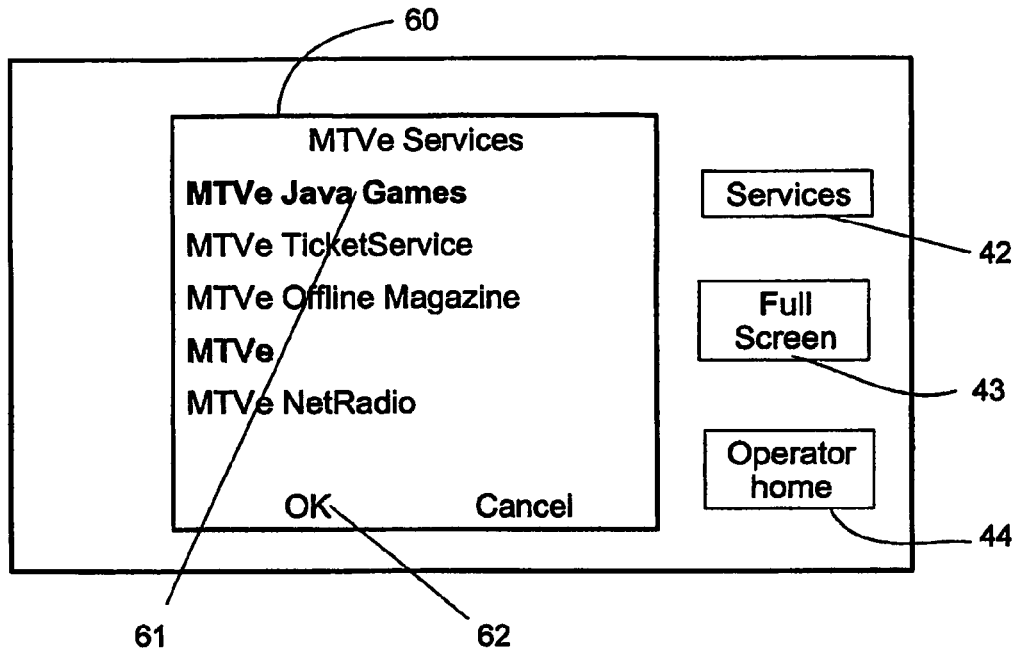
Figure 8:
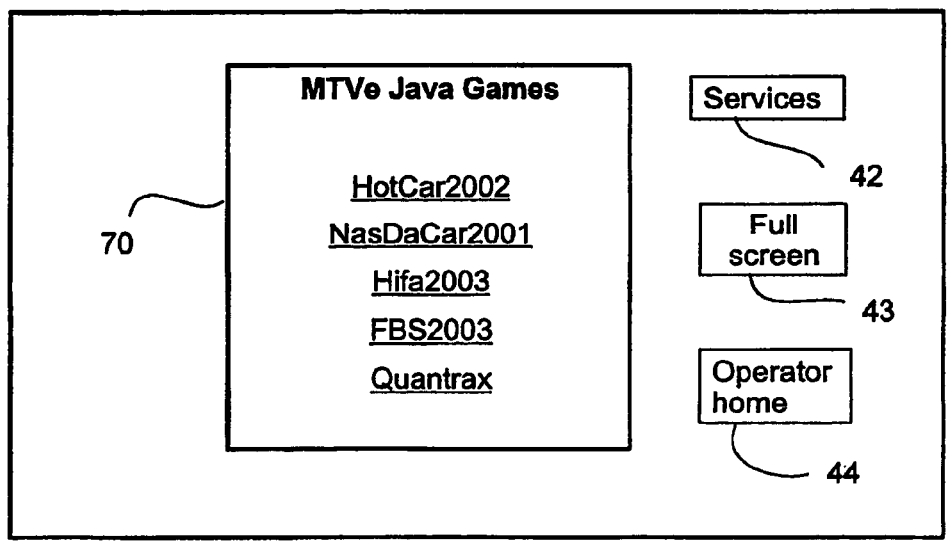

Referring to FIG. 7, the 'keys' 42-44 from the FIG. 5 display are again presented, along with a window 60 in which are listed the services forming part of the service set called MTVE. Selection of one of these services, in this case the service entitled 'MTVE Java Games' and labeled 61, occurs by highlighting the service and then by activating an 'OK' input 62 at the bottom of the window 60. This results in the presentation in the display of the service components which form part of the service. This is shown in FIG. 8. The selection may be cancelled by activating a 'Cancel' input at the bottom of the window 62, wherein the user is taken back to the previous view illustrated in FIG. 6.

In FIG. 8, the available service components are included in a service components window 70 in the display 24 and are shown underlined in this example, since these are items of consumable content. The consumable content items may be displayed by using other graphical effects such as with different colours, different fonts, or even as animated or with a combination of such graphical means. The 'keys' 42-44 from the FIG. 5 display may be again presented. A service component is selected for consumption through use of a stylus to operate an area of touch screen corresponding to the displayed name of the service component, or through the use of a keypad etc.

Alternatively to presenting the service components using a hierarchical menu system as described with reference to FIGS. 5 to 8, the mobile terminal 20 may instead sort the service components by genre, by the timing of the transmission of the service components, or in any other convenient manner. Sorting is carried out by the mobile terminal 20 using the service information data.

The invention claimed is:

1. A method comprising:
causing transmission of a plurality of services, each of the services comprising one or more service components, at least some of the service components having different media formats, the service components for a given service being transmitted in a time-sliced manner on a given channel, wherein the service components are transmitted in bursts with an interval between end of a first burst and start of a second burst, and content of consecutive bursts is the same or at least partly different;
generating service identification data relating service components to services on that channel;
repeatedly causing transmission of the service identification data on the channel; and
repeatedly causing transmission of information relating to timing of a subsequent transmission of the service identification data and a given frequency of the channel at which the subsequent transmission of the service identification data will occur, wherein the method is a method of providing service selection for a mobile terminal.

2. The method as claimed in claim 1, in which the generating service identification data relating service components to services on that channel includes generating data identifying the media format of each service component.

3. The method as claimed in claim 1,
wherein the generating service identification data relating service components to services comprises identifying the media format of each service component.

4. The method as claimed in claim 1, further comprising causing transmission of the information relating to the timing of the subsequent transmission of the service identification data in a network different than that used for the transmitting the service identification data on the channel.

5. The method as claimed in claim 4, wherein transmitting the information relating to the timing of the subsequent transmission of the service identification data is performed in response to an inquiry from a mobile terminal.

6. The method as claimed in claim 5, wherein transmitting the information relating to the timing of the subsequent transmission of the service identification data is performed in response to an inquiry transmitted from the mobile terminal using the different network.

7. The method as claimed in claim 1, comprising using the service identification data to generate a service guide for one or more services.

8. The method as claimed in claim 1, further comprising:
receiving the service identification data at a mobile terminal; and
at the mobile terminal, hierarchically arranging the services including the service components from the received service identification data.

9. The method as claimed in claim 1, wherein the method is a computer-implemented method and at least one step is performed by a computer.

10. A computer readable medium encoded with instructions that, when executed by a computer, perform the steps of claim 1.

11. An apparatus comprising:
a transmitter configured to transmit a plurality of services, each of the services comprising one or more service components, at least some of the service components having different media formats, the service components for a given service being arranged to be transmitted in a time-sliced manner on given channel, wherein the service components are arranged to be transmitted in bursts with an interval between end of a first burst and start of a second burst, and content of consecutive bursts is the same or at least partly different; and
a generator configured to generate service identification data relating service components on the channel to services,
wherein the transmitter is configured to repeatedly transmit the service identification data on the channel,
wherein the transmitter is configured to repeatedly transmit information relating to timing of a subsequent transmission of the service identification data and a given frequency of the channel at which the subsequent transmission of the service identification data will occur, and
wherein the apparatus is configured to provide service selection for a mobile terminal.

12. The apparatus as claimed in claim 11, in which the generator is configured to generate data identifying the media format of each service component.

13. The apparatus as claimed in claim 11,
wherein the transmitter is configured to transmit the media format of each service component.

14. The apparatus as claimed in claims 11, wherein the transmitter is configured to transmit the information relating to the timing of the subsequent transmission of the service identification data in a network different than that used for the service identification data information transmission.

15. The apparatus as claimed in claim 14, wherein the information relating to the timing of the subsequent transmission of the service identification data is transmitted in response to an inquiry from the mobile terminal.

16. The apparatus as claimed in claim 15, wherein the inquiry from the mobile terminal uses the different network.

17. The apparatus as claimed in claim 11, wherein the mobile terminal is arranged to use the service identification data to generate a service guide for one or more services.

18. The apparatus as claimed in claim 11, wherein the mobile terminal is arranged to receive the service identification data, and to use it to arrange hierarchically the services including the service components.

19. An apparatus comprising:
a receiver configured to receive at least one repeated transmission of information relating to timing of a subsequent transmission of service identification data and a given frequency of a channel at which the subsequent transmission of the service identification data will occur;
a tuner configured to use the information to tune to the channel at an appropriate time to decode service identification data, the service identification data relating service components on the channel to services; and
a processor configured to subsequently obtain, from service components transmitted in a time-sliced manner on the channel, required service components of a service, wherein the service components are arranged to be received in bursts with an interval between end of a first burst and start of a second burst, and content of consecutive bursts is the same or at least partly different, and the apparatus is a mobile terminal.

20. The apparatus as claimed in claim 19, wherein the service identification data relates service components on the channel to services.

21. The apparatus as claimed in claim 19,
wherein the service identification data identifies the media format of each service component.

22. A method comprising:
receiving at least one repeated transmission of information relating to timing of a subsequent transmission of service identification data and a given frequency of a channel at which the subsequent transmission of the service identification data will occur;
using the information to tune to the channel at an appropriate time to decode service identification data, the service identification data relating service components at a frequency to services; and
subsequently obtaining, from service components transmitted in a time-sliced manner on the channel, required service components of a service, wherein the service components are received in bursts with an interval between end of a first burst and start of a second burst, and content of consecutive bursts is the same or at least partly different, and the method is a method of operating a mobile terminal.

23. The method as claimed in claim 22, wherein the service identification data relates service components on the channel to services.

24. The method as claimed in claim 22, wherein the service identification data identifies the media format of each service component.

25. The method as claimed in claim 24, further comprising using the service identification data to generate a service guide for one or more services.

26. The method as claimed in claim 22, wherein hierarchically arranging services comprises using data items describing the various service components for catergorizing received content items.

27. The method as claimed in claim 26, wherein the content items are categorized according to content type.

28. A method comprising:
providing service selection data using the method of claim 22; and
following selection of a displayed service set, service or service component, tuning to the correct channel at the appropriate time when the selected service set, service or service component is being transmitted.

29. The method as claimed in claim 22, wherein the method is a computer-implemented method and at least one step is performed by a computer.

30. A method comprising:
receiving service identification data relating service components at a given frequency to services and relating services at the given frequency to service sets, the service components for a given service being transmitted in a time-sliced manner on a given channel, wherein the service components are received in bursts with an interval between end of a first burst and start of a second burst, and content of consecutive bursts is the same or at least partly different;
receiving information relating to timing of a subsequent transmission of the service identification data and a given frequency of the channel at which the subsequent transmission of the service identification data will occur;
hierarchically arranging services including the appropriate service components; and
displaying the different service sets, services or service components, wherein the method is a method of providing service selection data on a display.

31. The method as claimed in claim 30, wherein the method is a computer-implemented method and at least one step is performed by a computer.

32. An apparatus comprising:
a receiver configured to receive service identification data relating service components on a given channel to services and relating services on the given channel to service sets, the service components for a given service arranged to be received in a time-sliced manner on the given channel, wherein the service components are arranged to be transmitted in bursts with an interval between end of a first burst and start of a second burst, and content of consecutive bursts is the same or at least partly different, the receiver being configured to receive information relating to timing of a subsequent transmission of the service identification data and a given frequency of the channel at which the subsequent transmission of the service identification data will occur;
a controller configured to order hierarchically services including the appropriate service components; and
a display configured to display the different service sets, services or service components, wherein the apparatus comprises a mobile terminal.

33. The apparatus as claimed in claim 32, wherein the receiver is configured to receive service identification data relating service components at a given frequency to services and relating services at the given frequency to service sets.

34. The apparatus as claimed in claim 32, wherein the controller is configured to use data items describing the various service components to categorize received content items.

35. The apparatus as claimed in claim 34, wherein the content items are categorized according to content type.

36. The apparatus as claimed in claim 32, wherein the apparatus is arranged to be responsive to selection of a displayed service set, service or service component, to tune to the correct channel at the appropriate time when the selected service set, service or service component is being transmitted.

* * * * *